United States Patent Office

3,424,555
Patented Jan. 28, 1969

3,424,555
PROCESS FOR CONVERTING ALKALI METAL TITANATES INTO THEIR PURE TITANIUM DIOXIDE PSEUDOMORPHS
Foord von Bichowsky, 1620 Harvey Road, Wilmington, Del. 19803
No Drawing. Filed May 11, 1966, Ser. No. 550,082
U.S. Cl. 23—202
Int. Cl. C01g 23/04
5 Claims

ABSTRACT OF THE DISCLOSURE

Alkali metal titanates are converted into pseudomorphs of titanium dioxide useful as thermal insulators, extenders and pigments by a reaction of said titanates with ammonium salts of monobasic acids at temperature not over about 250° C.

---

This invention relates to a new process for the conversion of alkali metal titanates into their pure titanium dioxide pseudomorphs through the use of reactants in the solid state. More particularly this invention has to do with the interaction in the dry condition of a member of the alkali metal titanate family with an ammonium salt of a monobasic acid at a temperature extending from room to below a visible red heat and at substantially atmospheric pressure and to the products obtained thereby.

The employment of the generally fibrous alkali metal titanates and especially the alkali metal hexatitanates is finding extensive use as extenders for papers, plastic materials, thermal insulating components and the like but in such uses one may encounter the drawbacks that the alkali metal titanates have substantially lower melting points than $TiO_2$ and also are sensitive to the action of water with a leaching out of a portion of their combined alkali metal oxide. For example: O. Schmitz-DuMont and H. Reckhard point out in the journal "Monatshefte fuer Chemie," vol. 90, pp. 134–42, 1959, that potassium ditatanate acted upon by water at 90° C. is substantially decomposed after 350 hours to normal anatase. Such a long-drawn-out process is not commercially feasible for stabilizing the titanates but on seeking for a means to attain a like stabilization I made the broad discovery that on heating a dry alkali metal titanate with a dry ammonium salt of a monobasic acid, ammonia was liberated in a recoverable form while the alkali metal or metals combined with oxygen were converted to water soluble salts and after leaching them out the titanium dioxide content of the titanate was recovered in pseudomorphic forms which, because of their then semiporous and etched structure and higher melting point appeared to be more useful in the arts than the parent substances.

A search of the literature in the field of the pseudomorphs of the alkali metal titanates does not disclose my products. As an example in Gmelins Handbuch anorg. Chemie 8. Aufl. Titan, 1951, p. 389, 2nd paragraph, and at the end of p. 395 some partly decomposed alkali metal titanates are described which still retain their original shapes but are not pure titanium dioxide replicas of the parent titanates since they retain a part of the original alkali metal content.

In the description of the present invention the term "pseudomorph" is to be understood as defining a mineral substance formed by a process of alteration and having the characteristic outward form of the parent crystal.

A more detailed explanation of the carrying out of the new process and of the products will be illustrated now by the following non-restrictive examples which, if needed, may be varied somewhat by one skilled in the art without however departing from the broad scope of the present invention.

Example 1

To 4 parts by weight of the prismatic crystals of the dialkali metal hexatitanate $NaKTi_6O_{13}$, as described in my U.S. Patent 3,320,025 issued May 16, 1967, is added 1 part by weight of ammonium chloride (ca. 1¼ times theory) and well incorporated by grinding, whereupon the mixture is heated with stirring in a glass container at from room temperature to about 250° C. until $NH_3$ no longer is given off. This usually takes about 2 hours. The $NH_3$ given off may be reacted with HCl to supply the $NH_4Cl$ for attacking another batch of titanate. The contents of the reaction vessel, preferably when cold, are leached with water, collected on a filter and the matted cake dried. The leach water may be worked up for its content of alkali metal salts. The dry $TiO_2$ resulting from the nearly quantitative reaction resembles, in outward appearance, the initial titanate.

Example 2

Into 3 parts by weight of fine fibrous $K_2Ti_6O_{13}$ is well mixed 1 part of ammonium nitrate and heated with stirring, as in Example 1, for approximately 2 hours at from about 50° to 160° C. When the evoluton of ammonia ceases and the reaction cake is cool, the reaction product is leached. Potassium nitrate may be recovered by concentration and the nitrate crystals reacted with fresh anatase in stoichiometric proportions to make fresh hexatitanate. The residual pseudomorphs of pure $TiO_2$ when examined under the electron microscope have the outward forms of the original hexatitanate. The X-ray diffraction pattern of the product is that of a very fine anatase.

Example 3

To 2 parts by weight of the somewhat needle-like potassium dititanate, as prepared from rutile or preferably anatase $TiO_2$ in accord with the known art, are added 3 parts by weight of commercial ammonium acetate. On well mixing the ingredients by grinding at room temperature the odor of $NH_3$ is detectable. Upon stirring and heating the mix in a stainless steel reactor from 20° to ca. 125° C., ammonia, then acetic acid is evolved. When the evolution of the latter has slowed down the reaction is over. This usually takes about 2 hours. The filter cake from the leaching of the reaction product is a pure $TiO_2$ pseudomorph of the original titanate in approximately quantitative yield. The filtrate contains potassium acetate which on recovery may be used as the potassium salt in forming with fresh $TiO_2$ more of the $K_2Ti_2O_5$. It may be noted that when O. Schmitz-DuMont et al. (l.c.) attacked potassium dititanate with acetic acid 60 hours were required to convert their dititante to normal anatase $TiO_2$ while with the process of the present invention only about a thirtieth of that time was needed to make the new etched pure $TiO_2$ pseudomorph.

In the examples given above, three non-corrosive salts of ammonia may be employed interchangeably or admixed since all are readily available, moderate in price and of a sufficiently low molecular weight to keep the ratio of alkali metal titanate to the ammonium salt within reasonable limits. For those mentioned reasons and perhaps others it is recommended to use an ammonium salt of a monobasic acid, said salt having a molecular weight of between 38 and 100.

Of the compounds of alkali metal or metals which are combined with various proportions of titanium dioxide to form the titanates there are employed those alkali metals which have an atomic number not exceeding 19. Therefore they comprise lithium, sodium and potassium. In the process of this invention, for reasons of economy, alkali metal titanates are used which contain an amount of combined titanium dioxide that exceeds 62% by weight. Consequently they include among others the commercial dititanates, trititanates and hexatitanates, e.g., potassium dititanate, sodium trititanate, potassium hexatitanate and my new hexatitanates that contain pairs of the alkali metals, i.e., sodium and potassium, potassium and lithium.

Now having described and defined the process and the aims of the present invention by examples and in detail, what I claim as specific thereto is:

1. Process for converting alkali metal titanates into pseudomorphs of pure titanium dioxide which comprises reacting in a solid state an alkali metal titanate, containing not more than two atoms of alkali metal, such metal having an atomic number not exceeding 19, with an ammonium salt of a monobasic acid, selected from the group consisting of ammonium chloride, ammonium nitrate and ammonium acetate at a temperature not above about 250° C. and at substantially atmospheric pressure then leaching out the byproduct soluble alkali metal salt and recovering the titanium dioxide pseudomorph.

2. Process for converting alkali metal titanates into pseudomorphs of pure titanium dioxide which comprises reacting in a solid state an alkali metal dititanate containing not more than two potassium atoms with the ammonium salt of acetic acid at a maximum temperature of around 125° C. and at substantially atmospheric pressure then leaching out byproduct metal salt and recovering the pure titanium dioxide pseudomorph.

3. Process for converting alkali metal titanates into pseudomorphs of substantially pure titanium dioxide which comprises reacting in the solid state an alkali metal trititanate containing not more than two sodium atoms with the dry ammonium salt of hydrochloric acid at a maximum temperature of about 250° C. and then leaching out byproduct alkali metal salt and recovering the substantially pure titanium dioxide pseudomorph.

4. Process for converting alkali metal titanates into pseudomorphs of substantially pure titanium dioxide which comprises reacting in the solid state an alkali metal hexatitanate containing two potassium atoms with ammonium nitrate at a maximum temperature of about 50° C. to 160° C. then leaching out and recovering the substantially pure titanium dioxide pseudomorph.

5. Process for converting alkali metal titanates into pseudomorphs of substantially pure titanium dioxide which comprises reacting in the solid state a mol of a dialkali metal hexatitanate containing an atom of sodium and one of potassium with somewhat more than two mols of ammonium nitrate at a maximum temperature of about 50° C. to 160° C. then leaching out the reaction mixture to remove byproduct salts and recovering the substantially pure titanium dioxide peeudomorph.

References Cited

UNITED STATES PATENTS

| | | | |
|---|---|---|---|
| 2,714,550 | 8/1955 | Miller | 23—219 |
| 3,103,419 | 9/1963 | Hunter et al. | 23—219 |
| 3,331,660 | 7/1967 | Berry | 23—202 XR |

OTHER REFERENCES

Hackh's "Chemical Dictionary," 3rd ed., revised, 1944, p. 693, McGraw-Hill Book Co., Inc., New York.

EDWARD STERN, *Primary Examiner.*

U.S. Cl. X.R.

23—51, 100, 102, 193; 260—541